US009288219B2

(12) United States Patent
Abuelsaad et al.

(10) Patent No.: US 9,288,219 B2
(45) Date of Patent: Mar. 15, 2016

(54) DATA PROTECTION IN A NETWORKED COMPUTING ENVIRONMENT

(71) Applicant: GLOBALFOUNDRIES Inc., Grand Cayman (KY)

(72) Inventors: Kelly Abuelsaad, Poughkeepsie, NY (US); Don T. Bailey, Fort Worth, TX (US); Shane B. McElligott, Apex, NC (US); Hien Q. Nguyen, Beaverton, OR (US); Susan M. Romero, Seattle, WA (US); Jeffrey D. Young, Raleigh, NC (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 264 days.

(21) Appl. No.: 13/957,967

(22) Filed: Aug. 2, 2013

(65) Prior Publication Data

US 2015/0040217 A1    Feb. 5, 2015

(51) Int. Cl.
*G06F 11/00*     (2006.01)
*H04L 29/06*     (2006.01)

(52) U.S. Cl.
CPC .................. *H04L 63/1408* (2013.01)

(58) Field of Classification Search
CPC .............. H04L 63/145; H04L 63/1416; H04L 63/1408; G06F 21/56
USPC ................................................ 726/22, 23, 10
See application file for complete search history.

(56) References Cited

U.S. PATENT DOCUMENTS

| 6,690,647 | B1 | 2/2004 | Tang et al. |
| 6,721,793 | B1 | 4/2004 | Corless |
| 6,963,920 | B1 | 11/2005 | Hohmann et al. |
| 7,849,187 | B2 | 12/2010 | Chang et al. |
| 7,934,103 | B2 | 4/2011 | Kidron |
| 2009/0037583 | A1 | 2/2009 | Alessandri et al. |
| 2009/0054157 | A1 | 2/2009 | Hamilton, II et al. |
| 2010/0218250 | A1* | 8/2010 | Mori et al. ...................... 726/22 |
| 2013/0111545 | A1* | 5/2013 | Sharma et al. .................... 726/1 |
| 2014/0157405 | A1* | 6/2014 | Joll et al. ......................... 726/22 |

OTHER PUBLICATIONS

Maitland, J., "Keeping Control Isn't Easy", Chapter 4: Cloud-Based Infrastructure, SearchCloudComputing.com, 13 pages. No publication date cited.
Mell, P. et al., "The NIST Definition of Cloud Computing", National Institute of Standards and Technology, Information Technology Laboratory, Version 15, Oct. 7, 2009, 2 pages.
Sara, Copyright 2012, www.sara.nl, 5 pages. No authors cited.
Maitland, J., "Keeping Control Isn't Easy", Chapter 4: Cloud-Based Infrastructure, SearchCloudComputing.com, Publication Date: Oct. 2009, 17 pages.

* cited by examiner

*Primary Examiner* — Ali Abyaneh
(74) *Attorney, Agent, or Firm* — Heslin Rothenberg Farley & Mesiti P.C.

(57) ABSTRACT

An approach for monitoring and protecting electronic data in a networked computing environment (e.g., a cloud computing environment) is provided. In a typical embodiment, an activity monitor gathers characteristics of data traffic of one or more virtual machines. The data traffic is analyzed to determine whether any of the data traffic is indicative of a malicious activity (e.g., unauthorized data transfers). If it appears a VM is engaging in malicious activity, then a counter for the VM is incremented by a predefined value that is associated with the malicious activity. When the counter for the VM exceeds a point threshold, a remediation action is taken with respect to the VM.

20 Claims, 8 Drawing Sheets

| REMEDIATION ACTION | THRESHOLD VALUE |
|---|---|
| NOTIFY | 4 POINTS |
| ISOLATE | 6 POINTS |

FIG. 6A

| ACTIVITY | POINT VALUE |
|---|---|
| UNEXPECTED PORT | 2 POINTS |
| P2P SOFTWARE DETECTED | 4 POINTS |
| EXCESSIVE BANDWIDTH | 2 POINTS |
| INTENTIONAL RANDOMIZED TRAFFIC PATTERNS DETECTED | 2 POINTS |
| SINGLE OR CASCADE PROXIES DETECTED | 2 POINTS |

FIG. 6B

| VIRTUAL MACHINE IDENTIFIER (VM ID) | CURRENT POINTS |
|---|---|
| VM 72A | 4 POINTS |
| VM 72B | 2 POINTS |

FIG. 6C

| VIRTUAL MACHINE IDENTIFIER (VM ID) | CURRENT POINTS |
|---|---|
| VM 72A | 0 POINTS |
| VM 72B | 2 POINTS |

FIG. 6D

| VIRTUAL MACHINE IDENTIFIER (VM ID) | CURRENT POINTS |
|---|---|
| VM 72A | 6 POINTS |
| VM 72B | 2 POINTS |

| VM ID | IMAGE | USER | ACTION |
|---|---|---|---|
| VM 72A | DB2 | USER@ACME.COM | ISOLATED |

FIG. 6G

| VM ID | IMAGE | USER | ACTION |
|---|---|---|---|
| VM 72A | DB2 | USER@ACME.COM | ISOLATED |
| VM 72C | DB2 | USER@ACME.COM | ISOLATED |

DATA PROTECTION IN A NETWORKED COMPUTING ENVIRONMENT

TECHNICAL FIELD

Embodiments of the present invention relate generally to sharing of electronic data. Specifically, the present invention relates to monitoring and protecting electronic data in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In a cloud computing environment, virtual machines, platform services, and software services are often shared and used by multiple users as well as other cloud systems. In this environment, value may be provided by detecting when data piracy or authorized access to sensitive data or intellectual property (IP) occurs.

SUMMARY

In general, embodiments of the present invention relate to an approach for monitoring and protecting electronic data in a networked computing environment (e.g., a cloud computing environment). In a typical embodiment, an activity monitor gathers characteristics of data traffic of one or more virtual machines. The data traffic is analyzed to determine whether any of the data traffic is indicative of a malicious activity (e.g., unauthorized data transfers). If it appears a VM is engaging in malicious activity, then a counter for the VM is incremented by a predefined value that is associated with the malicious activity. When the counter for the VM exceeds a point threshold, a remediation action is taken with respect to the VM.

A first aspect of the present invention provides a method for monitoring data traffic in a networked computing environment, comprising the computer-implemented steps of: gathering characteristics of data traffic associated with a cloud resource, wherein the gathering is consistent with a privacy agreement of the cloud provider; analyzing data traffic to determine whether the data traffic is indicative of unusual activity based on one or more characteristics, wherein the one or more characteristics are determined from information about the resource received from a cloud provider database and the unusual activity is associated with a malicious activity; incrementing a counter by a predefined value, wherein the counter is associated with the cloud resource and the predefined value is associated with the malicious activity; and performing a remediation action when the counter exceeds a predefined threshold.

A second aspect of the present invention provides a system for monitoring data traffic in a networked computing environment, comprising: an activity monitor configured to: gather characteristics of data traffic associated with a cloud resource, wherein the gathering is consistent with a privacy agreement of the cloud provider; analyze data traffic to determine whether the data traffic is indicative of unusual activity based on one or more characteristics, wherein the one or more characteristics are determined from information about the resource received from a cloud provider database and the unusual activity is associated with a malicious activity; increment a counter by a predefined value, wherein the counter is associated with the cloud resource and the predefined value is associated with the malicious activity; and perform a remediation action when the counter exceeds a predefined threshold.

A third aspect of the present invention provides a computer program product for monitoring data traffic in a networked computing environment, the computer program product comprising a computer readable storage media, and program instructions stored on the computer readable storage media, to: gather characteristics of data traffic associated with a cloud resource, wherein the gathering is consistent with a privacy agreement of the cloud provider; analyze data traffic to determine whether the data traffic is indicative of unusual activity based on one or more characteristics, wherein the one or more characteristics are determined from information about the resource received from a cloud provider database and the unusual activity is associated with a malicious activity; increment a counter by a predefined value, wherein the counter is associated with the cloud resource and the predefined value is associated with the malicious activity; and perform a remediation action when the counter exceeds a predefined threshold.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In this disclosure, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

As indicated above, embodiments of the present invention relate to an approach for monitoring and protecting electronic data in a networked computing environment (e.g., a cloud computing environment). In a typical embodiment, an activity monitor gathers characteristics of data traffic of one or more virtual machines. The data traffic is analyzed to determine whether any of the data traffic is indicative of a malicious activity (e.g., unauthorized data transfers). If it appears a VM is engaging in malicious activity, then a counter for the VM is incremented by a predefined value that is associated with the malicious activity. When the counter for the VM exceeds a point threshold, a remediation action is taken with respect to the VM.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
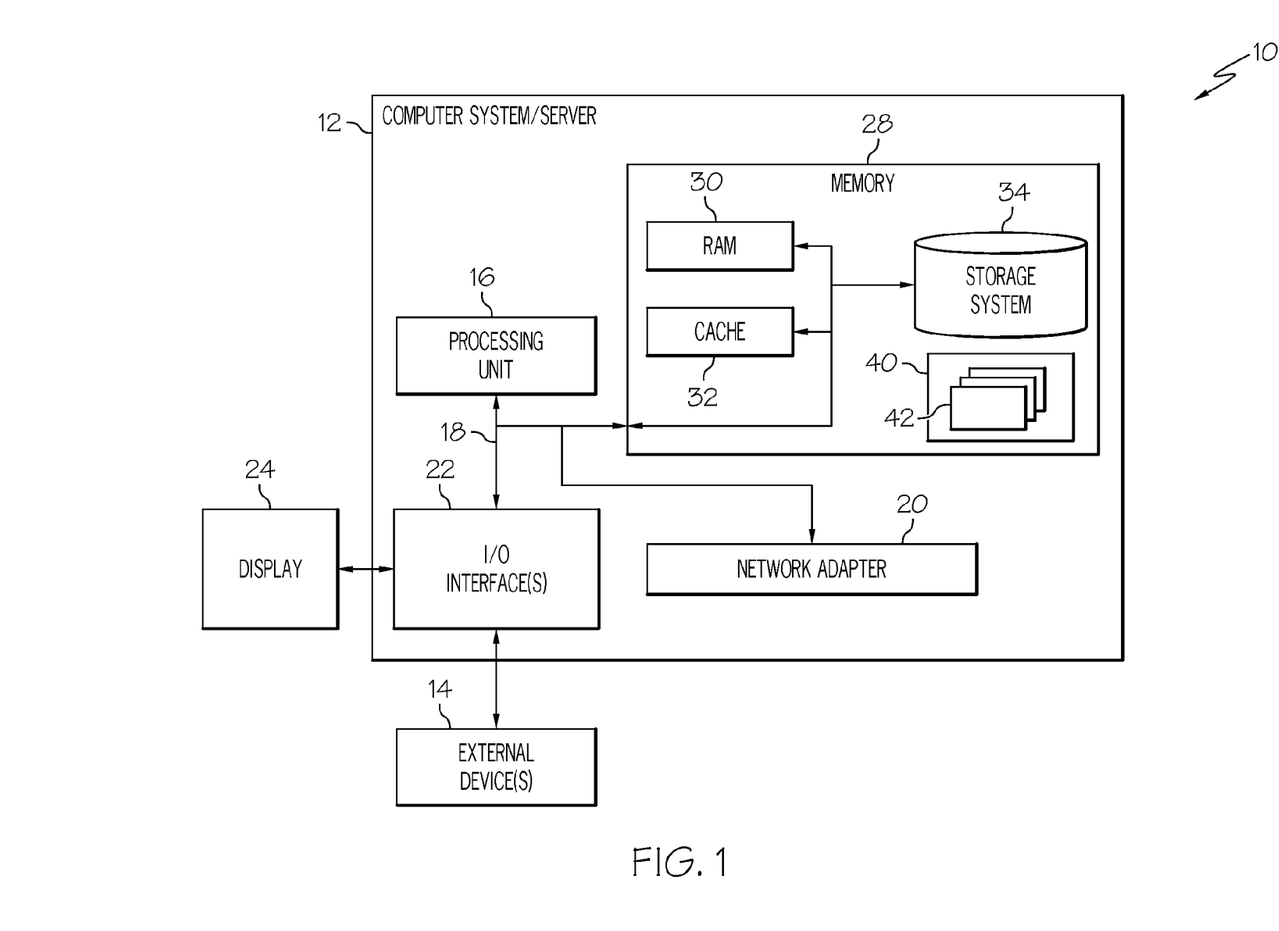
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
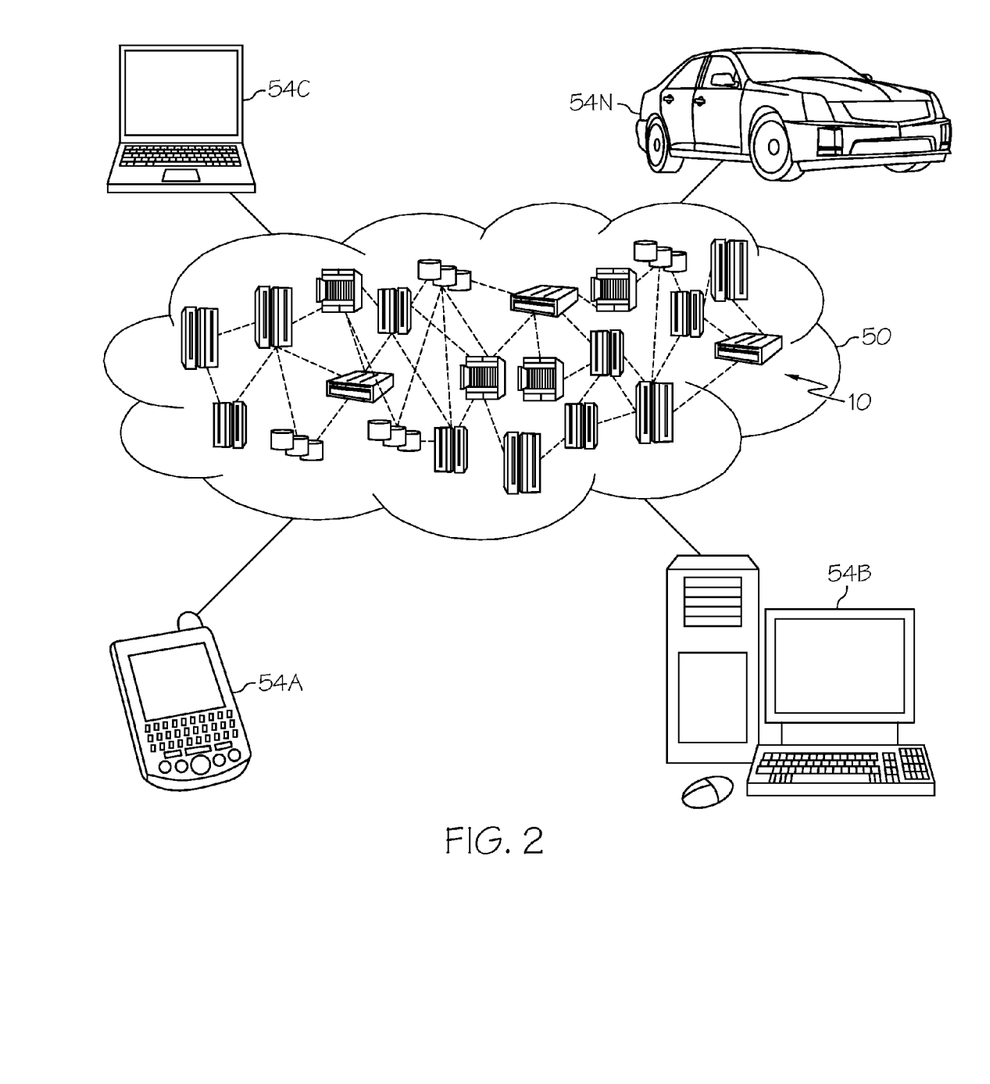
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
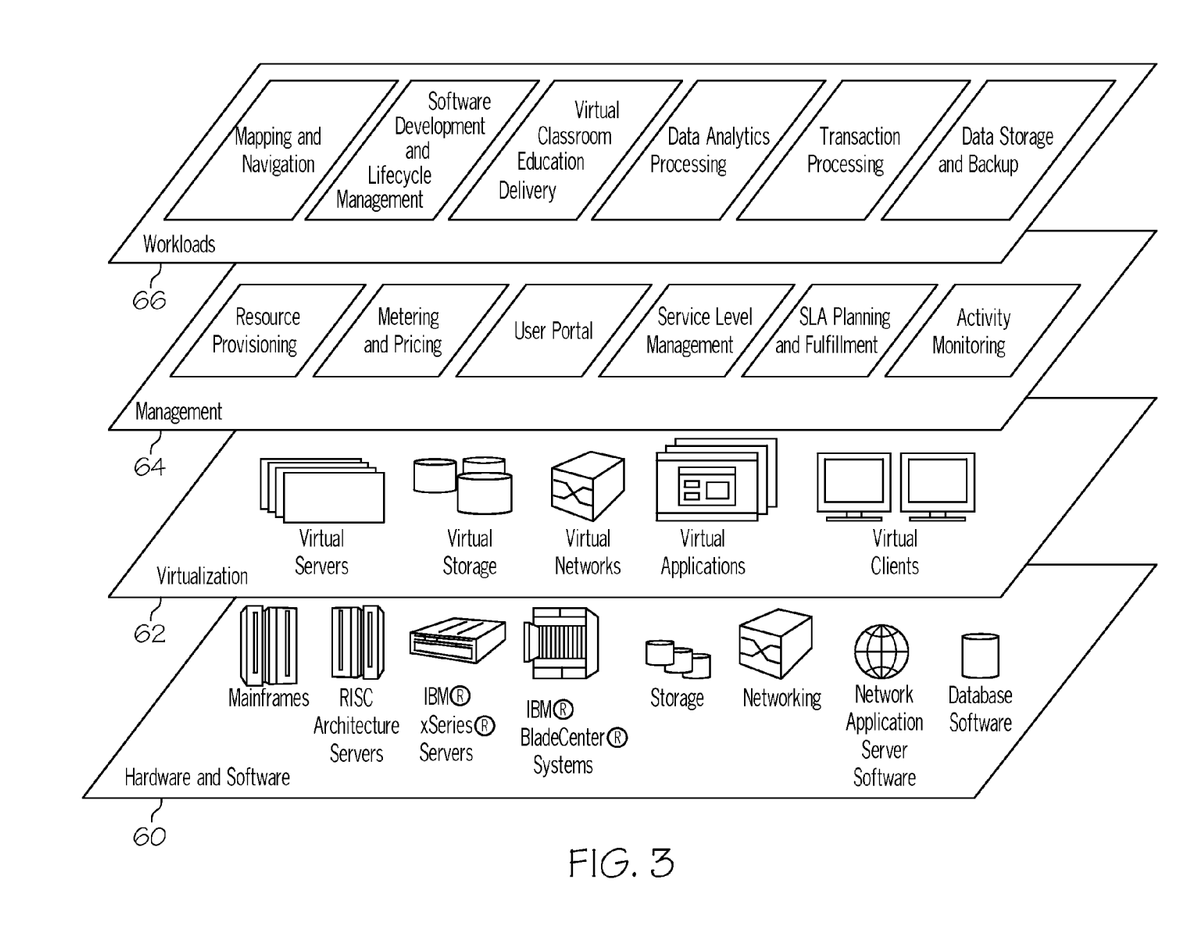
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM system P® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, system x, System p, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is activity monitoring, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the activity monitoring functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

In a public cloud environment scenario, cloud users may be knowingly or unknowingly sharing unauthorized content. Furthermore, a cloud environment could be used to create bit torrent or magnet swarms which share protected data at rapid rates. The fast, self-service provisioning capabilities of cloud computing environments can easily give rise to "Wack-A-Mole" scenarios, whereby a server of a violating party is taken offline and another is quickly provisioned in its place.

The detection of piracy, IP, or sensitive data violations may not be straightforward. Anonymization protocols may be used by those participating in peer-to-peer sharing, making it nearly impossible to identify the source or destination of such types of traffic. Additionally, in some cloud environments, a customer's data cannot be examined. This also severely limits the cloud provider's ability to detect culprit software, as they cannot take advantage of the common practice of scanning the disks of machines on the network to look for the software or pirated data. Any tool which tries to prevent these exposures in the cloud environment must operate under the legal guidelines of the service level agreement (SLA), which can limit the capabilities of the cloud provider in protecting against malevolent activities.

The activity monitoring system may examine trends and patterns of behaviors of network traffic flows which are within the legal jurisdiction for monitoring by a cloud provider. An analysis of various factors including protocols on the network, bandwidth and resources being used, amount of data being transferred, source and destination addresses into and out of cloud instances, virtual cloud instance behavior traits and tendencies, and other factors may be processed and analyzed to determine the potential for exposure. This material may then be provided to an analyst who may take the assessment into consideration and weigh it against the risks of taking action against the potentially offending cloud instances. The activity monitoring system provides an analysis and assessment tool for providing a security or legal analyst the most prudent assessment of copyright, sensitive data, or IP violation exposure in a cloud environment. The activity monitoring system may serve as a watchdog in the cloud environment by providing early warnings without examining customer data. It may gather information on the aforementioned patterns in the cloud environment, calculate the risk factor, and alert accordingly.

Figure 4:
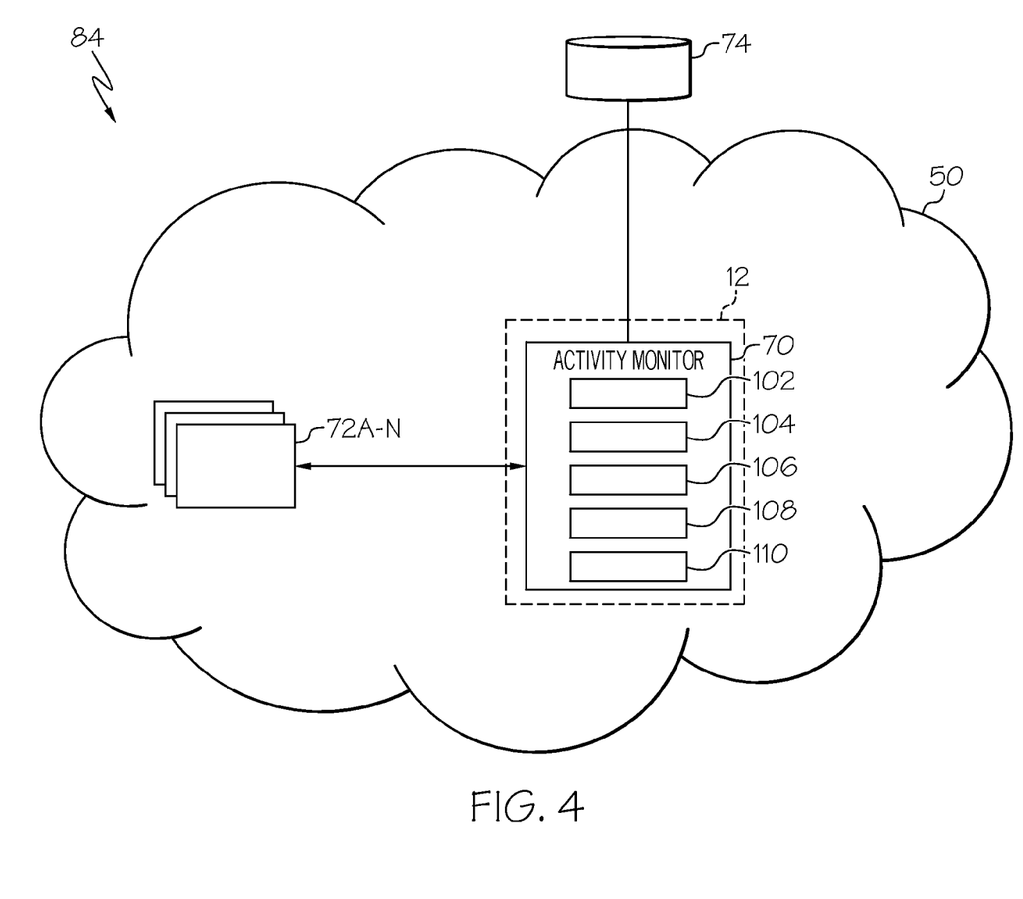
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 84 (e.g., a cloud computing environment 50). A computer system/server 12, which can be implemented as either a stand-alone computer system or as a networked computer system is shown in FIG. 4. In the event the teachings recited herein are practiced in a networked computing environment 84, each client need not have an activity monitor 70. Rather, activity monitor 70 could be loaded on a server or server-capable device that communicates (e.g., wirelessly) with the clients to provide activity monitoring functionality. Regardless, as depicted, activity monitor 70 is shown within computer system/server 12. In general, activity monitor 70 can be implemented as program/utility 40 on computer system 12 of FIG. 1 and can enable the functions recited herein.

Along these lines, activity monitor 70 may perform multiple functions similar to a general-purpose computer. Specifically, among other functions, activity monitor 70 may: gather characteristics of data traffic of a virtual machine; analyze data traffic of the virtual machine to determine whether the data traffic is indicative of a malicious activity; increment a counter associated by a predefined value, wherein the counter is associated with the virtual machine and the predefined value is associated with the malicious activity; and perform a remediation action when the counter exceeds a predefined threshold.

Illustrative Example

This section will describe the above-discussed teachings in the context of an illustrative example. It is understood that this example (e.g., the applications, services, values, etc., recited herein) are intended to be illustrative and that other embodiments may exist within the teachings described herein.

As shown in FIG. 4, cloud computing environment 50 includes computer system 12 and virtual machines (VM's) 72A-N within networked computing environment 84. Computer system 12 includes activity monitor 70. The activity monitor 70 may read cloud provider database 74 to perform its functions. As shown, activity monitor 70 includes data gathering module 102, filtering module 104, traffic analysis module 106, reporting module 108, and remediation module 110.

Figure 5:
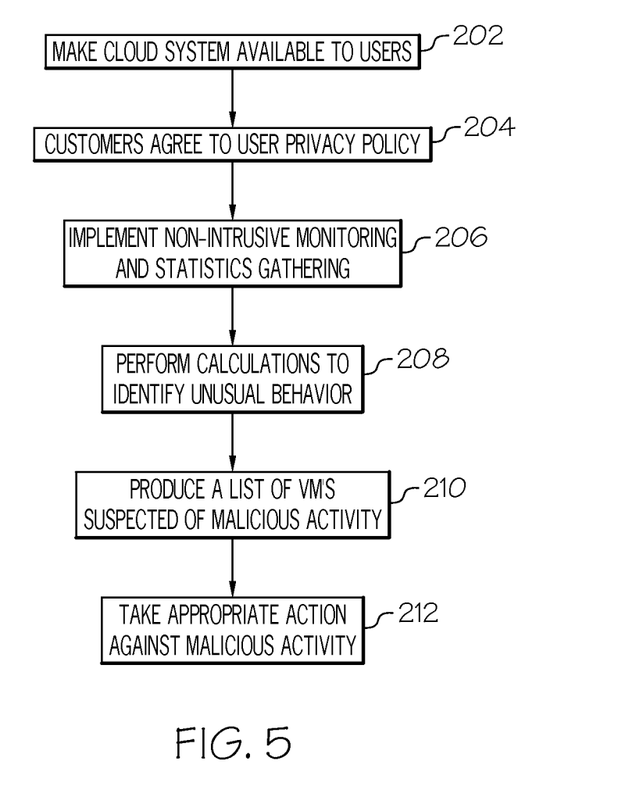
FIG. 5 depicts a method flow diagram according to an embodiment of the present invention.

FIG. 5 depicts a method flow diagram according to an embodiment of the present invention. At 202, a cloud provider may make its cloud environment system available for users to provision and utilize virtual machines. At 204, in the interest of data privacy for the customer, the cloud provider may agree to not access or examine any data that the customer hosts via their cloud resources, nor perform any deep packet inspection of the network traffic.

At 206, the data gathering module 102 of the activity monitor 70 may gather characteristics of VM's 72A-N. The characteristics may include, but are not limited to, the following:

a. whether there is traffic on the network that is being anonymized;

b. whether the anonymous traffic is present on network equipment which routes traffic internally in the cloud network and/or if it is found on network devices that connect to external networks to the cloud environment;

c. the protocols and ports being used, the frequency, and the existence of any observable pattern(s);

e. source and destination addresses of network traffic (if not being anonymized);

f. virtual network interface card bandwidth usage for each virtual machine owned by a customer, as gathered from hypervisor data;

g. central processing unit (CPU) and memory usage for each virtual machine owned by a customer, as gathered from hypervisor data;

h. any software that is known or probable to exist on the virtual machine based on the known characteristics of the image it was provisioned from, as many cloud providers offer customers the ability to provision VM's with software pre-installed on it, such as database software or web servers; and i. data about the user who owns the virtual machine in question, such as (1) the types of machines the user has provisioned in the past, and (2) whether the user is part of a known corporate email account or an unknown person with a public email address (e.g., a hotmail email address).

The filtering module 104 may filter out known "normal" traffic based on user configurable normal traffic criteria. The normal traffic criteria may be stored in cloud provider database 74. For example, cloud providers may offer a customer the ability to provision one or more VM's with software pre-installed on it, such as database software or web servers. Any software that is known or probable to exist on a particular VM based on the known characteristics of the image it was provisioned from may be filtered out by filtering module 104.

In one example, the activity monitor 70 may maintain a configurable list of pattern detection features, a point assignment for each pattern detected, and action threshold per VM. The activity monitor 70 may also track virtual machines, their administrator=defined activity profiles, provisioning history, and their current point assignments.

At 208, the traffic analysis module 106 of activity monitor 70 may gather the data gathered above which may be analyzed to identify the behavior of the virtual machines in the cloud environment. For example, in the presence of anonymized traffic, the traffic analysis module 106 may infer which virtual machines may be generating/receiving it by subtracting the traffic that has not been anonymized as gathered from network equipment (via identified source/destination addresses) from the actual amount of data transferred by examining the hypervisor's report of the network interface controller (NIC) activity: (NIC data transfer total−identified unanonymized traffic throughput on the network devices=amount of data transmitted anonymously).

In another example of traffic analysis, the traffic analysis module 106 may identify which VM's are transferring data over ports and/or protocols known to be common with peer-to-peer applications, I2P (Invisible Internet Project) services, TOR networks (originally short for The Onion Router), or other network darkening technologies. For I2P services, I2P uses port 4444. It is possible to change the port, but 4444 is nonetheless a strong indicator of I2P's presence. For TOR networks, monitoring for traditional peer-to-peer applications can be performed at the entry and exit points of a TOR network. The traffic analysis module 106 may also search for onion routing patterns (i.e., layers of encryption and randomized dispersion of data across volunteer software routers within a cloud). For other network darkening technologies (e.g., Garlic Routing, Freenet/Perfect Dark, or any other mix-net technologies), the technologies may have similar vulnerabilities as the network periphery as well as patterns of intentional randomization for which the engine will need to be programmed to detect. The criteria for searching for identifying such technologies will need to be consistently updated to stay ahead of rapidly developing anonymization technologies.

The traffic analysis module 106 may identify which VM's are consuming unusually large amounts of bandwidth, identify which VM's could be seeding a torrent, based on observed patterns, and/or identify which VM's are acting "out of character." For example, if a VM was created from an image that had database software pre-installed on it, it would be expected that large amounts of traffic would flow in and out of the database over a common database port, with protocols that are common to that particular database type. However, if the VM traffic is using a port or protocol not commonly used for that type of database with large traffic flowing over it, the behavior may be noted as possibly "out of character".

In another example of traffic analysis, the traffic analysis module 106 may recognize a Wack-A-Mole scenario. In other words, the traffic analysis module 106 may identify which instance keeps re-spawning itself. To accomplish this, the traffic analysis module 106 may recognize when a re-provisioning request is submitted for the same type of instance and the same type of traffic is being transmitted and/or received at the same frequency. It will also be noted whether a new Internet protocol (IP) address is requested on each provisioning request. Configurable templates may be used to determine the signatures and characteristics which will indicate the Wack-A-Mole scenario is occurring. In one example, the configurable templates may be stored in cloud provider database 74.

In yet another example of traffic analysis, the traffic analysis module 106 may identify which VM's are being created by an unidentified or untrusted user (e.g., a VM owner having an email address that does not belong to a trusted customer or company, does not have a long history of provisions, or who has a past history of being flagged of transmitting unauthorized or malevolent data.

At 210, the reporting module 108 of activity monitor 70 may produce a report of virtual machines based on the traffic analysis that may be participating in the unauthorized transfer of files. The report may include the identity of each flagged VM, the probability that each respective VM is participating in unauthorized file sharing (e.g., 100% sure, 80% sure, etc.) or a risk rating (e.g., high risk, medium risk, etc.), and the reasoning for each assessment. For example, the reporting module 108 may report that it is 95% certain that the user of the VM is participating in unauthorized file sharing because the source and destination of its traffic is to a known piracy site. In another example, the reporting module 108 may report that it is 80% sure that a VM is participating in unauthorized file sharing because its traffic is anonymized and the traffic is using a port and protocol commonly known for peer-to-peer applications. In yet another example, the reporting module 108 may report that it is 50% sure that a VM is engaging in malicious activity because it is transferring data using known peer-to-peer ports and protocols. However, the reporting module 108 is only 50% sure because the traffic is not anonymized and it is not known whether the addresses it is communicating with carries or transmits pirated data.

At 212, once the statistical estimations have been generated, the remediation module 110 may perform a remediation process with respect to each VM appearing to be engaging in malicious activity based on the probability generated by the activity monitor 70. The remediation process may be defined by the cloud administrator. In one example, the remediation module 110 may automatically generate and send each notification to let the owners know they have been flagged as potential violators. In another example, the remediation module 110 may automatically quarantine or de-provision each violating VM. In yet another example, the remediation module 110 may send the report generated by the reporting module 108 to a cloud administrator who can make the manual judgment call on whether to pursue communication or any further action with each customer based on the report.

Figure 6A:
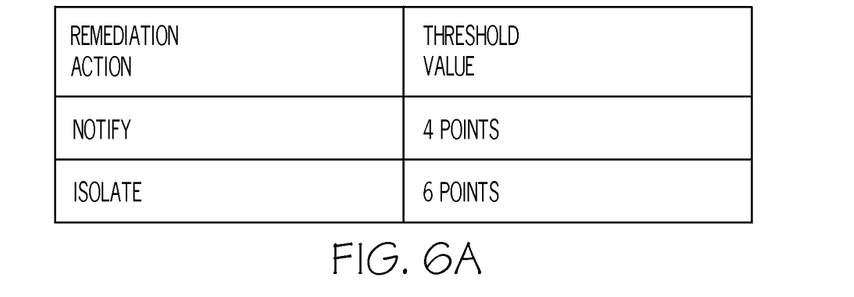
FIGS. 6A-G depict example remediation processes according to an embodiment of the present invention.

FIGS. 6A-G depict an example remediation process according to an embodiment of the present invention. Points may be assigned to a VM when the activity monitor 70 detects traffic over an unexpected port. When the assigned points reach a threshold for a particular VM, a remediation process may be performed against the VM. One or more threshold values and a corresponding remediation action for each respective threshold value may be defined by a cloud administrator. An example threshold table 300 is shown in FIG. 6A. The threshold table 300 holds two threshold values: 4 points and 6 points. If a particular VM reaches 4 points, the VM owner will be sent a notification. If the VM reaches 6 points, the VM will be isolated. In one example, the threshold table 300 may be stored in cloud provider database 74.

Figure 6B:
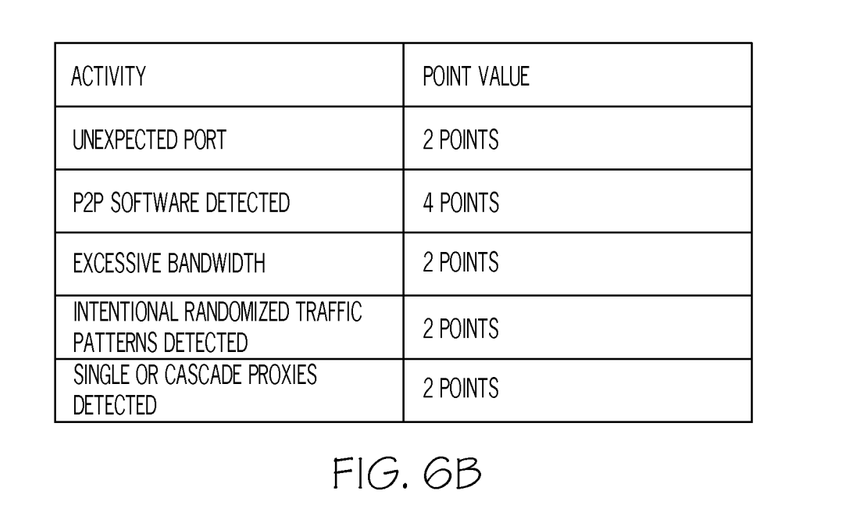
Figure 6C:
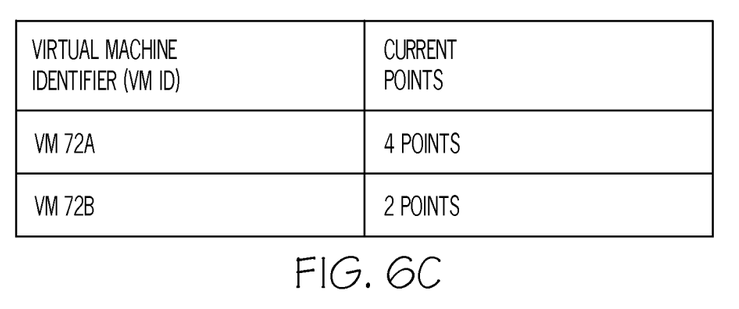
Figure 6D:
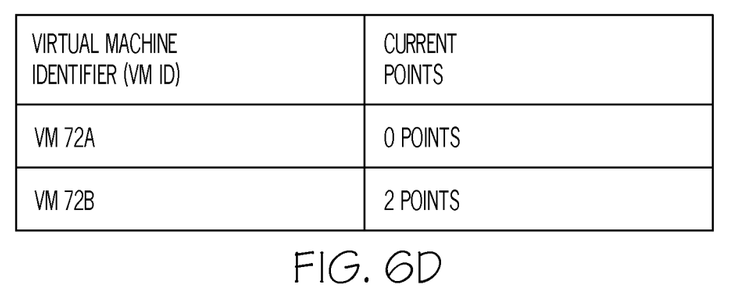

In this example, the activity monitor 70 detects traffic over an unexpected port on VM 72B and assigns 2 points to VM 72B, as shown in FIG. 6B. One or more unexpected ports may be defined by an administrator generated profile for a type of VM. In addition, the activity monitors detects peer-to-peer software on VM 72A and assigns 4 points to VM 72A, as shown in FIG. 6C. Since a threshold was configured at 4 points, the assignment of 4 points to VM 72A triggers a cloud administrator communication to the VM owner of VM 72A. Later, the activity monitor 70 detects excessive bandwidth on VM 72A and increments the points assigned to VM 72A by 2, giving VM 72A a total of 6 points, as shown in FIG. 6D. This triggers isolation of VM 72A, as configured by an administrator and a notification action.

Figure 6E:
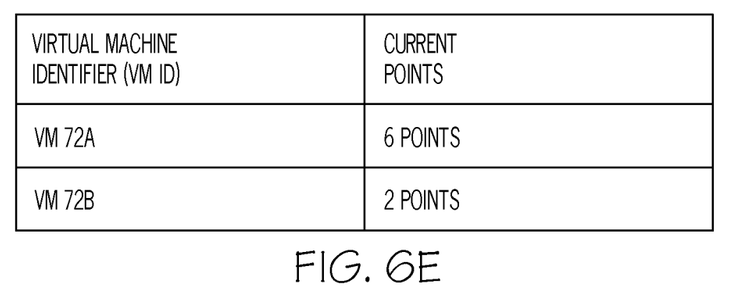

The activity monitor 70 may maintain a history of isolated VM's and associated user identifiers (IDs). As shown in FIG. 6E, the activity monitor 70 records the VM identifier (ID), image, user ID, and action taken in remediation history table 610. When VM 72A was isolated, the corresponding values associated with VM 72A written to the remediation history table 610.

Figure 6F:
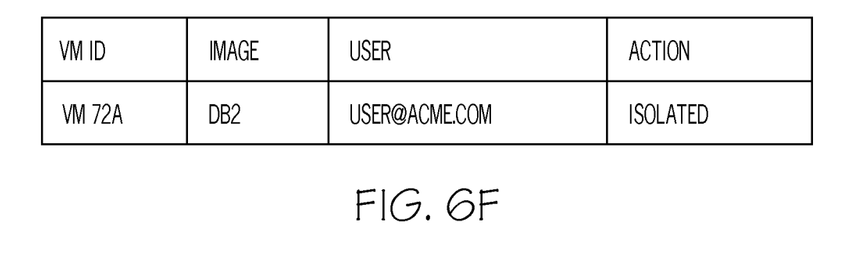
Figure 6G:
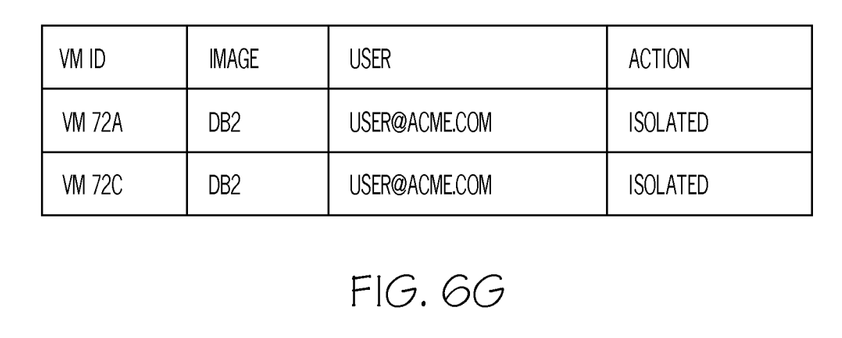

The activity monitor 70 may maintain configurable rules regarding repeated actions taken against user accounts to disrupt the re-provisioning of repeated systems. For example, the activity monitor triggers VM isolation on VM 72C, which is associated with the same user as VM 72A that has already been isolated. As shown in FIG. 6F, the corresponding values associated with VM 72C are written to the remediation history table. A second action taken against the user triggers the disabling of the user account and/or administrator notification. Image types commonly associated with actions may also be flagged as unsecured to review vulnerabilities that may exist.

In one example, user accounts may be assigned trust levels which affect action thresholds against the user account. A validated customer account with a history of re-provisioning an image may have a higher action threshold than an anonymous external account. For example, a warning may be given against a validated user account after 2 actions and account disablement may not be taken until the user accrues 10 actions.

While shown and described herein as an activity monitoring solution, it is understood that the invention further provides various alternative embodiments. For example, in one embodiment, the invention provides a computer-readable/useable medium that includes computer program code to enable a computer infrastructure to provide activity monitoring functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide activity monitoring functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for activity monitoring. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for monitoring data traffic in a networked computing environment, comprising:

gathering data traffic characteristics associated with a cloud resource, wherein the gathering is consistent with a privacy agreement of a cloud provider;

removing a subset of the gathered data traffic characteristics based on the gathered data traffic characteristics in the subset in accordance with a user configurable normal traffic criterion;

analyzing a remaining subset of the gathered data traffic characteristics to determine whether the remaining subset of the data traffic characteristics is indicative of unusual activity, based on one or more characteristics of the remaining subset of the data traffic characteristics, wherein the one or more characteristics are determined from information about a resource received from a cloud provider database, and the unusual activity is associated with a malicious activity;

creating a list of cloud recourses suspected of the malicious activity based on the analyzing, wherein the list comprises an identifier of a suspected cloud resource and a points counter associated with the suspected cloud resource, wherein the points counter indicates a need to remediate the suspected cloud resource when the points counter exceeds a predefined threshold number of points;

determining a probability that the suspected cloud resource is participating in the malicious activity and assigning a predefined value associated with the malicious activity to the suspected cloud resource based on the determined probability and the malicious activity;

incrementing the points counter by the predefined value; and performing a remediation action when the incremented points counter exceeds the predefined threshold number of points.

2. The method of claim 1, wherein the remediation action includes generating a notification to an owner of the suspected cloud resource or isolating the suspected cloud resource.

3. The method of claim 1, wherein a predefined template or pattern is used to determine whether the gathered data traffic characteristics are indicative of unusual activity.

4. The method of claim 1, wherein the predefined threshold is determined based on an identity of an owner of the suspected cloud resource.

5. The method of claim 1, wherein the malicious activity is identified based on one or more detected anonymization attempts associated with the suspected cloud resource.

6. The method of claim 1, wherein the malicious activity is identified based on detection of one or more detected respawns of the suspected cloud resource, wherein the suspected cloud resource is associated with a previous remediation action.

7. The method of claim 1, further comprising:

generating a report including a cloud resource identifier of the suspected cloud resource when the gathered data traffic characteristics associated with the suspected cloud resource are indicative of unusual activity.

8. The method of claim 1, wherein the method is performed by a service provider.

9. A system for monitoring data traffic in a networked computing environment, comprising:

a bus;

a processor coupled to the bus; and a memory medium coupled to the bus, the memory medium comprising instructions to perform a method comprising:

gathering data traffic characteristics associated with a cloud resource, wherein the gathering is consistent with a privacy agreement of a cloud provider;

removing a subset of the gathered data traffic characteristics based on the gathered data traffic characteristics in the subset in accordance with a user configurable normal traffic criteria criterion;

analyzing a remaining subset of the gathered data traffic characteristics to determine whether the remaining subset of the data traffic characteristics is indicative of unusual activity, based on one or more characteristics of the remaining subset of the data traffic characteristics, wherein the one or more characteristics are determined from information about a resource received from a cloud provider database, and the unusual activity is associated with a malicious activity;

creating a list of cloud recourses suspected of the malicious activity based on the analyzing, wherein the list comprises an identifier of a suspected cloud resource and a points counter associated with the suspected cloud resource, wherein the points counter indicates a need to remediate the suspected cloud resource when the points counter exceeds a predefined threshold number of points;

determining a probability that the suspected cloud resource is participating in the malicious activity, and assigning a predefined value associated with the malicious activity to the suspected cloud resource based on the determined probability and the malicious activity; increment the points counter by the predefined value, wherein the points counter is associated with the cloud resource and the predefined value is associated with the malicious activity; and performing a remediation action when the incremented points counter exceeds the predefined threshold number of points.

10. The system of claim 9, further comprising generating a notification to an owner of the suspected cloud resource or isolating the suspected cloud resource.

11. The system of claim 9, wherein a predefined template or pattern is used to determine whether the gathered data traffic characteristics are indicative of unusual activity.

12. The system of claim 9, wherein the predefined threshold is determined based on an identity of an owner of the suspected cloud resource.

13. The system of claim 9, wherein the malicious activity is identified based on one or more detected anonymization attempts associated with the suspected cloud resource.

14. The system of claim 9, wherein the malicious activity is identified based on detection of one or more detected respawns of the suspected cloud resource, wherein the suspected cloud resource is associated with a previous remediation action.

15. A computer program product for monitoring data traffic in a networked computing environment, the computer program product comprising a computer readable storage media device, and program instructions stored on the computer readable storage media device, to perform a method comprising:

gathering characteristics associated with a cloud resource, wherein the gathering is consistent with a privacy agreement of a cloud provider;

removing a subset of the gathered data traffic characteristics based on the gathered data traffic characteristics in the subset in accordance with a user configurable normal traffic criterion;

analyzing a remaining subset of the gathered data traffic characteristics to determine whether the remaining subset of the data traffic characteristics is indicative of unusual activity, based on one or more characteristics of the remaining subset of the data traffic characteristics, wherein the one or more characteristics are determined from information about a resource received from a cloud provider database, and the unusual activity is associated with a malicious activity;

creating a list of cloud recourses suspected of the malicious activity based on the analyzing, wherein the list comprises an identifier of a suspected cloud resource and a points counter associated with the suspected cloud resource, wherein the points counter indicates a need to remediate the suspected cloud resource when the points counter exceeds a predefined threshold number of points;

determining a probability that the suspected cloud resource is participating in the malicious activity, and assigning a predefined value associated with the malicious activity to the suspected cloud resource based on the determined probability and the malicious activity; increment the points counter by the predefined value, wherein the points counter is associated with the cloud resource and the predefined value is associated with the malicious activity; and performing a remediation action when the points counter exceeds the predefined threshold number of points.

16. The computer program product of claim 15, the method further comprising:

generating a notification to an owner of the suspected cloud resource or isolating the suspected cloud resource.

17. The computer program product of claim 15, wherein a predefined template or pattern is used to determine whether the gathered data traffic characteristics are indicative of unusual activity.

18. The computer program product of claim 15, wherein the predefined threshold is determined based on an identity of an owner of the suspected cloud resource.

19. The computer program product of claim 15, wherein the malicious activity is identified based on one or more detected anonymization attempts associated with the cloud resource.

20. The computer program product of claim 15, wherein the malicious activity is identified based on detection of one or more detected respawns of the cloud resource, wherein the cloud resource is associated with a previous remediation action.

* * * * *